United States Patent [19]
Cornell et al.

[11] Patent Number: 5,774,949
[45] Date of Patent: Jul. 7, 1998

[54] TRIM CLIP

[75] Inventors: Jeffrey J. Cornell, Royal Oak; Robert B. Nita, Rochester Hills, both of Mich.; David J. Vidal, Beamsville; John Wilusz, Hamilton, both of Canada

[73] Assignee: Eaton Corporation, Cleveland, Ohio

[21] Appl. No.: 918,999

[22] Filed: Aug. 27, 1997

[51] Int. Cl.⁶ .................................................. A44B 21/00
[52] U.S. Cl. ............................ 24/293; 24/289; 24/297; 411/508
[58] Field of Search ......................... 24/293, 297, 289, 24/292, 453, 458; 411/508; 52/718.01

[56] References Cited

U.S. PATENT DOCUMENTS

| | | | |
|---|---|---|---|
| 2,223,622 | 12/1940 | Kost | 24/453 |
| 2,249,902 | 7/1941 | Kral | 24/293 |
| 2,693,011 | 11/1954 | Fernberg | 24/293 |
| 4,595,325 | 6/1986 | Moran et al. | 411/173 |
| 4,606,688 | 8/1986 | Moran et al. | 411/175 |
| 4,630,338 | 12/1986 | Osterland et al. | 24/293 |
| 4,644,612 | 2/1987 | Osterland | 24/293 |
| 4,683,622 | 8/1987 | Oehlke | 24/458 |
| 5,036,567 | 8/1991 | Clinch | 24/453 |
| 5,108,239 | 4/1992 | Clinch | 411/175 |

*Primary Examiner*—Victor N. Sakran
*Attorney, Agent, or Firm*—Albert E. Chrow; Howard D. Gordon

[57] ABSTRACT

A clip (100) is provided that is adapted to be pressed into an opening (32) through a frame (30) with resilient fingers (12) and (12') operative to expand outwardly to enable sections (15) and (15') of fingers (12) and (12') to engage a lower edge (33) surrounding opening (32) through frame (30). A protuberance (26) extending from trim 24 is pressed between free-ends (18) and (18') respectively of prongs (16) and (16') extending from opposite sides of an aperture (22) through head portion (8) of clip (100) that are operative to secure trim (24) to clip (100) and frame (30). Fingers (12) and (12') extend from arms (10) and (10') of clip (100) whose free-ends (14) and (14') remain separated such that the lower end of clip (100) remain apart to prevent force imparted upon trim (24) from being transferred to clip (100).

5 Claims, 1 Drawing Sheet

U.S. Patent  Jul. 7, 1998  5,774,949
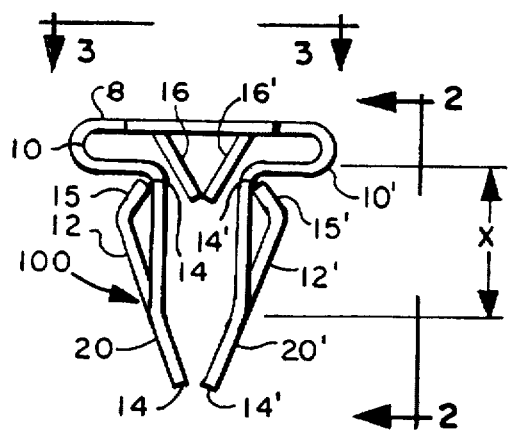
FIG. 1
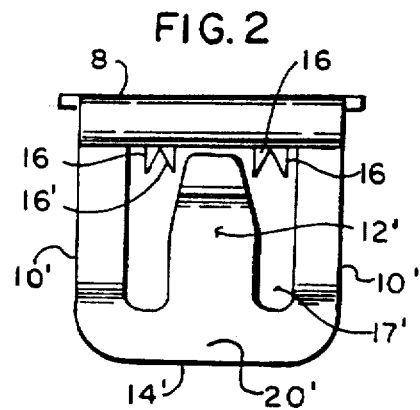
FIG. 2
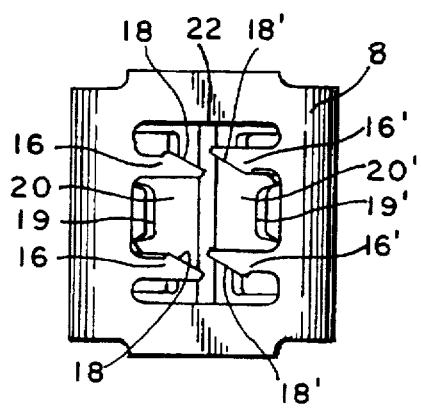
FIG. 3
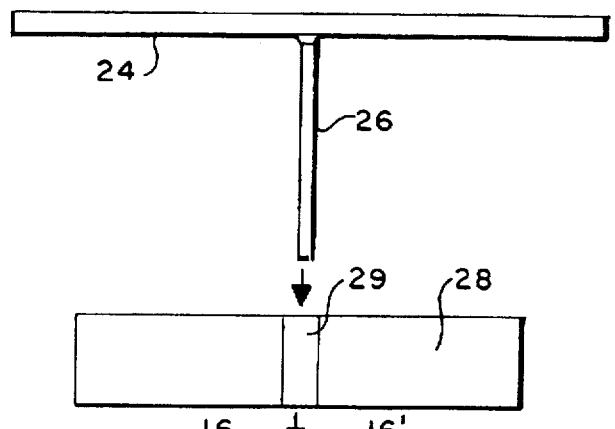
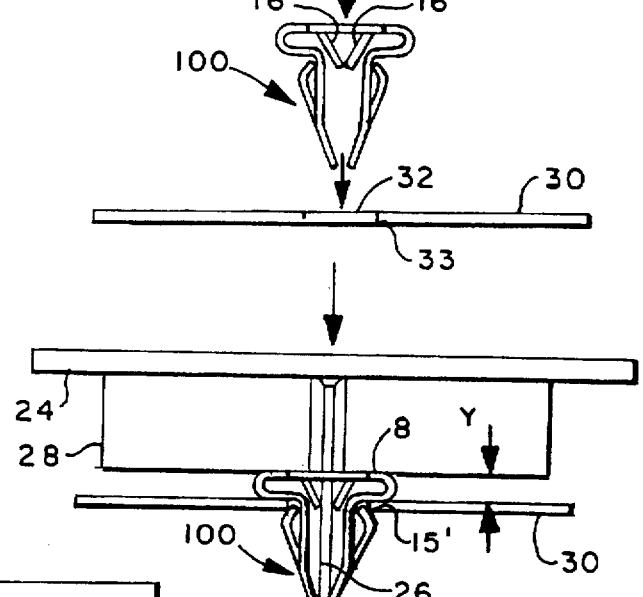
FIG. 5
PRIOR ART
FIG. 4

5,774,949

TRIM CLIP

INTRODUCTION

This invention relates generally to a clip for securing trim to a frame member such as an automobile body panel and more particularly to a clip that is adapted to receive a protuberance therethrough that extends from the trim through an opening in the frame member for securement of the trim thereto.

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

A multitude of fasteners have heretofore been developed to secure trim to a frame member such as an automobile body panel.

Such clips have most commonly featured a compressible section adapted to be inserted through an opening in the frame member and then expand to secure the clip to the frame member and another section having means such as a threaded opening for securing the trim to the clip by a threaded fastener such as a screw or by other suitable means.

Examples of such prior art type clips are disclosed in U.S. Pat. Nos. 5,108,239; 5,036,567; 4,683,622; 4,595,325 and 4,606,688, the disclosures of which are incorporated herein by reference and all of which are assigned to the assignee of the present invention.

An example of yet another type of molding clip is disclosed in U.S. Pat. No. 4,630,338, the disclosure of which is incorporated herein by reference. This clip however has the disadvantage of having its lower legs locked together enabling contact with the end of a fastener being used to secure the molding and thus enables transfer of force imparted to the molding whereas the clip of the present invention is open-ended and prevents such force transfer.

The trim clip of the present invention is simple and economical to manufacture by eliminating thread forms in favor of locking prongs yet is operative to enable rapid attachment of trim to a frame by either pressing a portion of the clip through an opening in the frame and then pressing a protuberance extending from the trim into the clip or by first pressing the protuberance into the clip and then pressing the clip through the opening in the frame with the added advantage that the portion of the clip in the frame opening is open-ended and thus does not engage the free-end of the protuberance for transfer of impact forces and the like imparted upon the trim.

BRIEF SUMMARY OF THE INVENTION

Accordingly, it is an object of this invention to provide a clip for securing trim to a frame member.

It is another object of this invention to provide a clip that is economical to manufacture and enables rapid securement of trim to a frame member.

It is yet another object of this invention to provide a clip for securing trim to a frame member that is open-ended and prevents the transfer of impact forces imparted upon the trim.

BRIEF DESCRIPTION OF THE DRAWINGS

FIG. 1 is an end view of an embodiment of the clip of the invention referenced by numeral 100;

FIG. 2 is a side elevation view of clip 100 taken along view line 2—2 in FIG. 1;

FIG. 3 is a top elevation view of clip 100 taken along view line 3—3 in FIG. 1;

FIG. 4 is an end view of a prior art clip referenced 5 numeral 25 that is being used to secure trim 24 to a frame 30; and FIG. 5 shows one process or method by which clip 100 is used to secure trim 24 to a frame 30.

DETAILED DESCRIPTION OF THE INVENTION

Although clip 100 of FIG. 1 may be made from a suitably resilient plastic material, it is preferably a one-piece construction made from a suitably resilient sheet metal of suitable thickness.

Clip 100 has a substantially flat head portion 8 having an aperture 22 therethrough that is best shown in FIG. 3.

Although aperture 22 may have any configuration, it is preferably rectangular in shape as shown in FIG. 3.

A pair of resilient arms 10, 10' extend respectively downwardly away from opposite ends of head portion 8 and thence cure inwardly towards each other such that each is in substantial spaced-apart parallel relationship with overhanging head portion 8 and thence curve and extend substantially transversely away from head portion 8 in substantial parallel relationship to each other for a prescribed distance "x" at which distance they respectively curve angularly inwardly towards each other in a direction away from head portion 8 to respective spaced-apart free-ends 14 and 14'.

Each of arms 10 and 10' have a window therethrough of which window 17' through arm 10' is shown in FIG. 2. As such, a bridging portion 20' extends across arm 10' between free-end 14' and window 17'. Although not shown in the Figures, a bridging portion 20 likewise extends across arm 10 between free-end 14 and a window 17 therethrough.

A pair of resilient fingers 12, 12' respectively extend from bridging portions 20 and 20' angularly upwardly away from each other in a direction towards head portion 8 and then respectively curve angularly inwardly towards each other and end in respective spaced-apart facing free-ends 19 and 19'. As shown in FIGS. 1 and 5, arm 12 has a section 15 adjacent free-end 19 and arm 12' has a section 15' adjacent free-end 19' that are adapted to engage lower edge 33 of frame 30 surrounding opening 32 upon expansion after arms 12 and 12' have been contracted while being inserted through opening 32 as shown by the arrows in FIG. 5.

At least one prong extends angularly downwardly towards the center of aperture 22 from an edge of head portion 8 surrounding aperture 22. As shown in FIG. 3, a pair of spaced-apart prongs 16, 16' preferably extend angularly downwardly from head portion 8 as shown in FIG. 1 from one side of aperture 22 and an opposed pair of spaced-apart prongs 16, 16' extend angularly downwardly from head portion 8 towards the center of aperture 22 from the opposite side of aperture 22. The free-ends of opposed prongs 16, 16' and 16', 16' are operative to receive the trim protuberance therebetween and lockingly secure the trim thereto is hereinafter described with respect to FIG. 5.

As shown in FIG. 3, the free-ends of prongs 16, 16 and 16', 16' are preferably pointed by means of prongs 16 each having a singular tapered surface 18 at their free-ends facing towards one end of head portion 8 and prongs 16' each having a singular tapered surface 18' at their free-ends facing towards an opposite end of head portion 8.

One process or method by which clip 100 of the invention is used to secure trim to a frame member is shown in FIG. 5 where trim 24 has a protuberance 26 extending substantially transversely therefrom. Although protuberance 26 may have any suitable cross-sectional configuration, it is preferably rectangular in cross-section as is aperture 22 of clip 100 is previously described.

A resilient foam material 28 is preferably included in the assembly of trim 24 onto frame 30 as shown in FIG. 5 to assist in preventing loosening of the assembly.

In operation, free-ends 14 and 14' of arms 10 and 10' are pressed through opening 32 causing fingers 12 and 12' to contract towards each other and then to expand away which enable sections 15 and 15' adjacent free ends 19 and 19' of fingers 12 and 12' respectively to engage edge 33 to lockingly secure clip 100 to frame 30.

Protuberance 26 of trim 24 is inserted through opening 29 through foam 28 and thence between prongs 16 and 16' until foam 28 (or trim 24) without foam) engages head portion 8 enabling prongs 16 and 16' to engage protuberance 26 and secure trim 24 to frame 30 either before or after clip 100 is secured to frame 30 as earlier described.

Due to the curvature of arms 10 and 10' downwardly and beneath overhanging head portion 8 as previously described, foam 28 or trim 24 will necessarily be displaced a distance "Y" away from frame 30 as shown in FIG. 5.

One particular advantage of the clip of the invention is that arms 10 and 10' remain spaced-apart from each other at free-ends 14 and 14' as shown in FIG. 5 such that the free-end of protuberance 26 is unable to engage bridging portions 20 and 20' of arms 10 and 10' respectively and is thus unable to transfer force imparted upon trim 24 whereas in the prior art fastener 25 shown in FIG. 4, the lower end of fastener 25 is closed as referenced by numeral 34 and thus can be engaged by the free-end of protuberance 26 to transfer force thereto imparted upon trim 24 resulting in possible distortion or loosening of fastener 25.

We claim:

1. A clip for securing trim to a frame member having an opening therethrough for receiving a protuberance extending from the trim, said clip comprising:

a substantially flat head portion extending between opposite ends thereof;

an aperture through the head portion adapted to receive the protuberance therethrough;

a pair of resilient arms respectively extending inwardly towards each other from the head portion opposite ends and thence transversely away from the body portion in substantial parallel spaced-apart relationship to each other for a prescribed distance and thence towards each other to respective free-ends disposed in spaced-apart facing relationship to each other and operative to engage opposite sides of the protuberance upon insertion thereof through the aperture therebetween with each of said arms having a window therethrough having a bridging portion between the window and the free-ends there across;

a pair of resilient fingers respectively extending from the bridging portions angularly outwardly away from each other in a direction towards the head portion for a prescribed distance and thence inwardly towards each other to respective free-ends disposed in spaced-apart relationship to each other, said fingers adapted to contract towards each other sufficiently to enable the arms and fingers to be received through the frame opening and thence spring outwardly away from each other sufficiently to enable a section of the fingers adjacent the free-ends to engage an edge of the frame surrounding the frame opening to secure the clip thereto; and at least one prong member respectively extending towards each other from opposite sides of an edge of the head portion surrounding the aperture in a direction towards the resilient arm free-ends and ending in respective free-ends disposed in spaced-apart relationship to each other and adapted to engage and secure the protuberance to the clip upon insertion thereof through the aperture.

2. The clip of claim 1 wherein the aperture is substantially rectangular and the protuberance has a substantially rectangular cross-section.

3. The clip of claim 1 having a pair of the prongs in spaced-apart relationship to each other on opposite sides of the aperture.

4. The clip of claims 1 or 3 wherein the prong free-ends have a substantially pointed configuration.

5. The clip of claim 4 wherein the pointed prongs on one side of the aperture free-ends are provided by each prong having a singular tapered surface facing towards one end of the head portion and the pointed prongs on the opposite side of the aperture are provided by each prong having a singular tapered surface facing towards the opposite end of the head portion.

* * * * *